United States Patent Office 2,907,769
Patented Oct. 6, 1959

2,907,769

11-METHOXY-17α-CYANO-16β-METHOXY CARBONYL-20α-YOHIMBANE COMPOUNDS

Georges Muller, Nogent sur Marne, and Roland Bardoneschi, Tremblay-les-Gonesse, France, assignors to Les Laboratoires Francais de Chimiotherapie, Paris, France, a French body corporate No Drawing. Application April 11, 1958
Serial No. 727,778

Claims priority, application France June 21, 1957

5 Claims. (Cl. 260—287)

The present invention relates to a new and valuable 20α-yohimbane compound of the reserpine series and, more particularly, to the levorotatory 11-methoxy-17α-cyano - 18β - (3′,4′,5′ - trimethoxy benzoyloxy) - 16β-methoxy carbonyl-3β,20α-yohimbane, and to a process of making the same.

20α-yohimbane compounds of the reserpine series are of considerable interest as physiologically active compounds having noteworthy pharmaco-dynamic properties. More in particular, such compounds are of considerable interest as hypotensive agents and as transquilizers.

It is one object of the present invention to provide a new and valuable substituted 20α-yohimbane compound of the reserpine series which has pharmaco-dynamic properties.

Another object of the present invention is to provide suitable starting materials and intermediates for the synthesis of said new and valuable substituted 20α-yohimbane compound.

Still another object of the present invention is to provide a simple and effective process of producing said new and valuable substituted 20α-yohimbane compound of the reserpine series and its starting materials and intermediates.

Other objects of the present invention and advantageous features thereof will become apparent as the description proceeds.

In principle, the present invention relates to a 20α-yohimbane compound of the Formula XVIII:

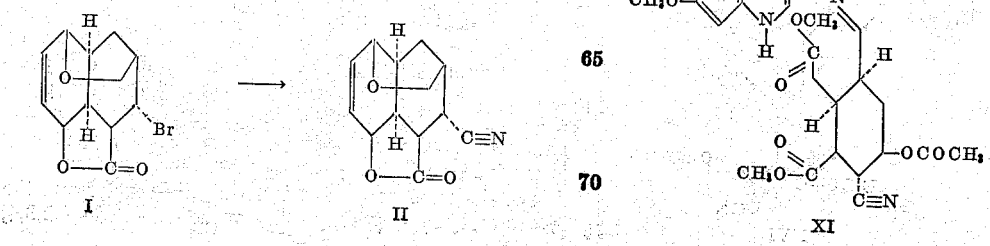

According to the present invention said 20α-yohimbane compound is prepared by a reaction which is illustrated by the formulas of the following reaction diagram.

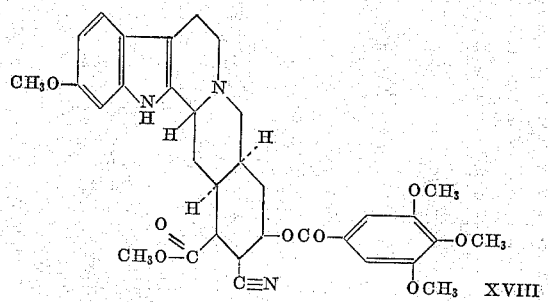

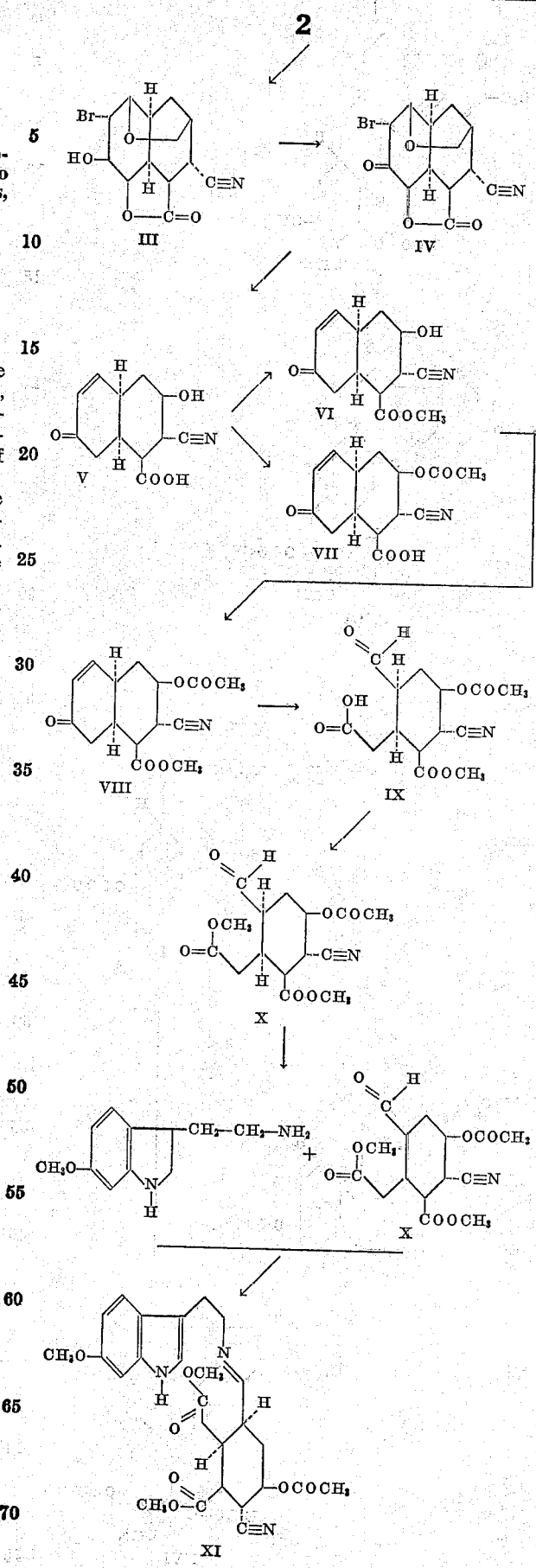

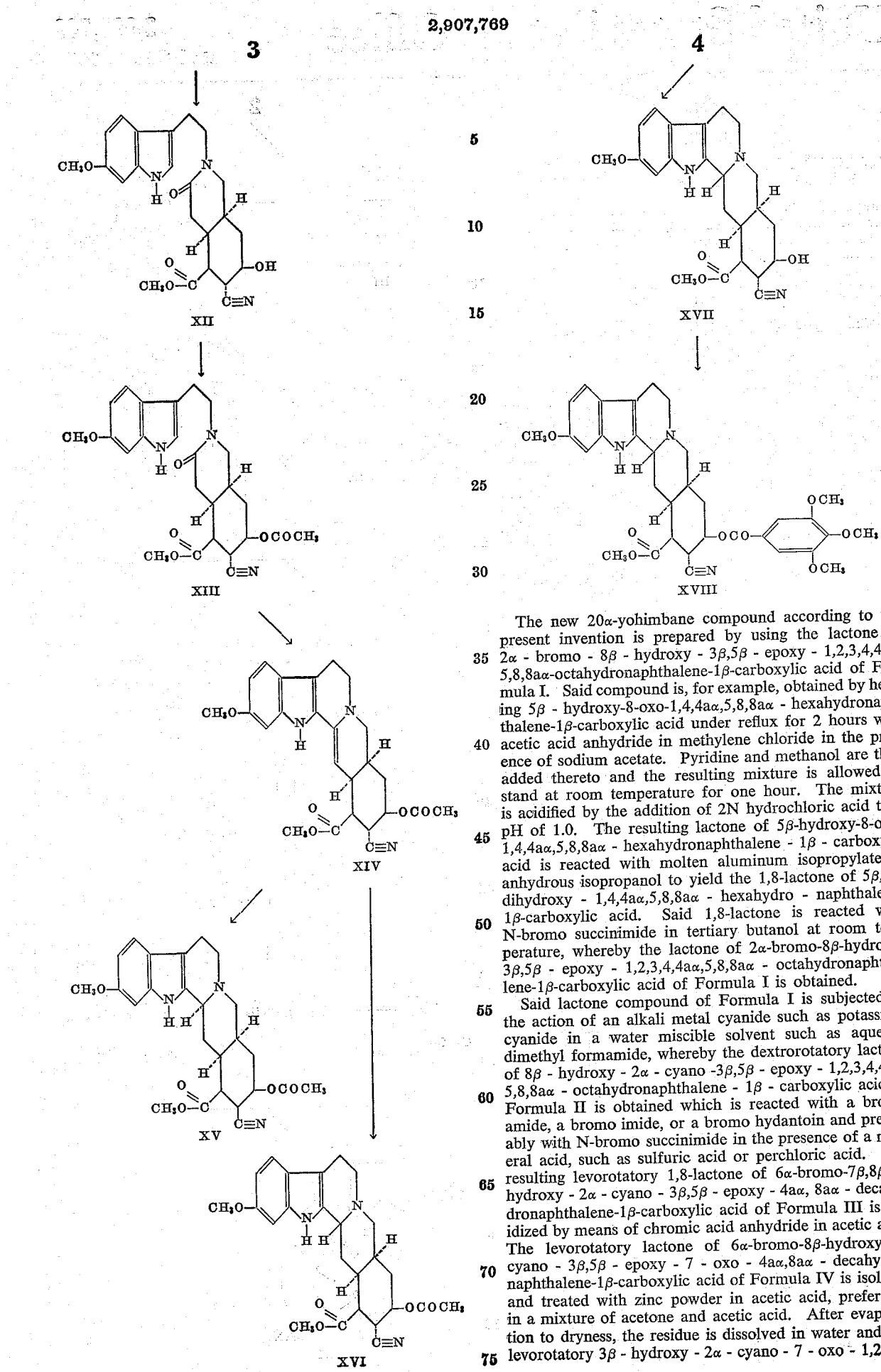

The new 20α-yohimbane compound according to the present invention is prepared by using the lactone of 2α - bromo - 8β - hydroxy - 3β,5β - epoxy - 1,2,3,4,4aα, 5,8,8aα-octahydronaphthalene-1β-carboxylic acid of Formula I. Said compound is, for example, obtained by heating 5β - hydroxy-8-oxo-1,4,4aα,5,8,8aα - hexahydronaphthalene-1β-carboxylic acid under reflux for 2 hours with acetic acid anhydride in methylene chloride in the presence of sodium acetate. Pyridine and methanol are then added thereto and the resulting mixture is allowed to stand at room temperature for one hour. The mixture is acidified by the addition of 2N hydrochloric acid to a pH of 1.0. The resulting lactone of 5β-hydroxy-8-oxo-1,4,4aα,5,8,8aα - hexahydronaphthalene - 1β - carboxylic acid is reacted with molten aluminum isopropylate in anhydrous isopropanol to yield the 1,8-lactone of 5β,8β-dihydroxy - 1,4,4aα,5,8,8aα - hexahydro - naphthalene-1β-carboxylic acid. Said 1,8-lactone is reacted with N-bromo succinimide in tertiary butanol at room temperature, whereby the lactone of 2α-bromo-8β-hydroxy-3β,5β - epoxy - 1,2,3,4,4aα,5,8,8aα - octahydronaphthalene-1β-carboxylic acid of Formula I is obtained.

Said lactone compound of Formula I is subjected to the action of an alkali metal cyanide such as potassium cyanide in a water miscible solvent such as aqueous dimethyl formamide, whereby the dextrorotatory lactone of 8β - hydroxy - 2α - cyano -3β,5β - epoxy - 1,2,3,4,4aα, 5,8,8aα - octahydronaphthalene - 1β - carboxylic acid of Formula II is obtained which is reacted with a bromo amide, a bromo imide, or a bromo hydantoin and preferably with N-bromo succinimide in the presence of a mineral acid, such as sulfuric acid or perchloric acid. The resulting levorotatory 1,8-lactone of 6α-bromo-7β,8β-dihydroxy - 2α - cyano - 3β,5β - epoxy - 4aα, 8aα - decahydronaphthalene-1β-carboxylic acid of Formula III is oxidized by means of chromic acid anhydride in acetic acid. The levorotatory lactone of 6α-bromo-8β-hydroxy-2α-cyano - 3β,5β - epoxy - 7 - oxo - 4aα,8aα - decahydronaphthalene-1β-carboxylic acid of Formula IV is isolated and treated with zinc powder in acetic acid, preferably in a mixture of acetone and acetic acid. After evaporation to dryness, the residue is dissolved in water and the levorotatory 3β - hydroxy - 2α - cyano - 7 - oxo - 1,2,3,4, $4a\alpha,7,8,8a\alpha$-octahydronaphthalene-$1\beta$-carboxylic acid of Formula V is precipitated by acidifying the reaction solution. Said acid is then converted into the corresponding methyl ester by means of diazomethane and the resulting methyl ester of Formula VI is acetylated by means of acetic acid anhydride in the presence of a pyridine base. The levorotatory methyl ester of $3\beta$-acetoxy-$2\alpha$-cyano-7-oxo-$1,2,3,4,4a\alpha,7,8,8a\alpha$-octahydronaphthalene-$1\beta$-carboxylic acid of Formula VIII is obtained thereby. Said ester may also be prepared by acetylating the levorotatory $3\beta$-hydroxy-$2\alpha$-cyano-7-oxo-$1,2,3,4,4a\alpha,7,8,8a\alpha$-octahydronaphthalene-$1\beta$-carboxylic acid of Formula V and esterifying the resulting levorotatory $3\beta$-acetoxy-$2\alpha$-cyano-7-oxo-$1,2,3,4,4a\alpha,7,8,8a\alpha$-octahydronaphthalene-$1\beta$-carboxylic acid of Formula VII, i.e., by varying the order in which the reaction steps are carried out. The polyhydronaphthalene compound of Formula VIII is subjected to the action of ozone and the resulting ozonide is decomposed after excess ozone has been removed by passing nitrogen through the reaction solution, at a low temperature by means of iodic acid, preferably at a temperature between $-10°$ C. and $+35°$ C., periodic acid, or water. The resulting $1\beta$-carboxy methyl-$2\beta$-methoxy carbonyl-$3\alpha$-cyano-$4\beta$-acetoxy-$6\beta$-formyl cyclohexane of Formula IX is extracted from the reaction mixture, isolated, and converted into the corresponding methyl ester of Formula X by reaction with diazomethane. This ester is condensed with 6-methoxy tryptamine.

The resulting Schiff base compound of Formula XI, i.e., the methyl ester of $18\beta$-acetoxy-11-methoxy-$17\alpha$-cyano-$16\beta$-methoxy carbonyl-$2,3$-$3,4$-diseco-$\Delta^{4(21)},20\alpha$-yohimbene-3-carboxylic acid, is reduced by means of an alkali metal boronhydride such as potassium boronhydride in anhydrous methanol at a temperature between $+5°$ C. and $+40°$ C., whereby, at the same time, ring closure and a deacetylation in 18-position takes place. The dextrorotatory 11-methoxy-$17\alpha$-cyano-$18\beta$-hydroxy-3-oxo-$16\beta$-methoxy carbonyl-$2,3$-seco-$20\alpha$-yohimbane of Formula XII is obtained. Said yohimbane compound is acetylated to the dextrorotatory 11-methoxy-$17\alpha$-cyano-$18\beta$-acetoxy-3-oxo-$16\beta$-methoxy carbonyl-$2,3$-seco-$20\alpha$-yohimbane of Formula XIII which is subjected to the action of phosphorus oxychloride or thionyl chloride whereby ring closure between the carbon atoms 2 and 3 is effected, the double bond between the 3- and the 4-atoms migrates to the 3- and 14-positions by subsequent treatment with ammonia, and the levorotatory 11-methoxy-$17\alpha$-cyano-$18\beta$-acetoxy-$16\beta$-methoxy carbonyl-$\Delta^{3(14)},20\alpha$-yohimbene of Formula XIV is obtained. Said compound of Formula XIV is then reduced by means of an alkali metal boronhydride at about room temperature, whereby the $3\alpha$-isomer, i.e. the levorotatory 11-methoxy-$17\alpha$-cyano-$18\beta$-acetoxy-$16\beta$-methoxy carbonyl-$3\alpha,20\alpha$-yohimbane of Formula XV is obtained. When reducing the compound of Formula XIV by means of zinc in a lower alkanoic acid, such as acetic acid, a mixture of the $3\alpha$-isomer of Formula XV and the $3\beta$-isomer i.e. the levorotatory 11-methoxy-$17\alpha$-cyano-$18\beta$-acetoxy-$16\beta$-methoxy carbonyl-$3\beta,20\alpha$-yohimbane of Formula XVI is obtained. Said isomers are preferably separated by chromatographic absorption. Conversion into the corresponding nitrates also permits such separation of the isomers since the nitrate of the $3\alpha$-isomer is less soluble in acetone than that of the $\beta$-isomer. The hydroxyl group in $18\beta$-position of the compound of Formula XVI is then deacylated according to a special embodiment of the present invention, i.e. by refluxing with an alkali metal boronhydride in anhydrous methanol. The resulting levorotatory 11-methovy-$17\alpha$-cyano-$18\beta$-hydroxy-$16\beta$-methoxy carbonyl-$3\beta,20\alpha$-yohimbane of Formula XVII is then esterified by means of 3,4,5-trimethoxy benzoyl chloride or another esterifying functional derivative of 3,4,5-trimethoxy benzoic acid, such as its anhydride, or a mixed anhydride therewith, in the presence of a pyridine base and yields the levorotatory 11-methoxy-$17\alpha$-cyano-$18\beta$-$(3',4',5'$-trimethoxy benzoyloxy$)$-$16\beta$-methoxy carbonyl-$3\beta,20\alpha$-yohimbane of Formula XVIII. Said compound differs from reserpine in the replacement of the methoxy group in $17\alpha$-position by the cyano group, which group permits the preparation of new derivatives of compounds of the reserpine series with modified pharmacodynamic properties. This compound, however, is not only suitable as intermediate in the production of other valuable compounds, but it possesses also valuable physiological properties so that it is used therapeutically as hypotensive, tranquilizing, and the like agent.

The following examples serve to illustrate the present invention without, however, limiting the same thereto. More particularly, the reaction temperature, the nature of the solvents, the order of introducing the reaction components into the reaction vessel, the duration of the reaction, and other conditions may be varied by those skilled in the art in accordance with the principles set forth herein and in the claims annexed hereto. The melting points given in the examples are instantaneous melting points determined on the Maquenne block.

EXAMPLE 1

*Preparation of the dextrorotatory lactone of $8\beta$-hydroxy-$2\alpha$-cyano-$3\beta,5\beta$-epoxy-$1,2,3,4,4a\alpha,5,8,8a\alpha$-octahydronaphthalene-$1\beta$-carboxylic acid (Formula II).*

100 g. of the lactone of $2\alpha$-bromo-$8\beta$-hydroxy-$3\beta,5\beta$-epoxy-$1,2,3,4,4a\alpha,5,8,8a\alpha$-octahydronaphthalene $1\beta$-carboxylic acid of Formula I, melting at 152° C. and having a rotatory power of $[\alpha]_D^{20}=+93°$ (concentration: 0.5% in chloroform) are dissolved in 400 cc. of dimethyl formamide at 20° C. A solution of 50 g. of potassium cyanide in 400 cc. of water is added within 20 minutes while maintaining the temperature of the reaction mixture between 25° C. and 30° C. by cooling from the outside. The desired compound of Formula II crystallizes during the reaction. The mixture is cooled to 10° C. The crystals are filtered with suction and washed with 150 cc. of water. The water adhering to the crystals is removed by suction. The compound can be used without further purification for the following reaction step.

For analytical purposes, the compound is recrystallized in the form of colorless needles, which melt at 178° C. and have a rotatory power of $[\alpha]_D^{20}=+66°\pm5°$ (concentration: 0.5% in acetone). The compound is insoluble in ether, slightly soluble in water, alcohol, and dilute aqueous acid and alkaline solutions, and soluble in acetone and chloroform.

*Analysis.*—$C_{12}H_{11}O_3N$; molecular weight=217.22. Calculated: 66.35% C; 5.10% H; 22.10% O; 6.45% N. Found: 66.2% C; 5.2% H; 22.1% O; 6.4% N.

The compound has not yet been described in the literature.

EXAMPLE 2

*Preparation of the levorotatory 1,8-lactone of $6\alpha$-bromo-$7\beta,8\beta$-dihydroxy-$2\alpha$-cyano-$3\beta,5\beta$-epoxy-$4a\alpha,8a\alpha$-decahydronaphthalene-$1\beta$-carboxylic acid (Formula III)*

The total amount of crude product of Formula II obtained according to the preceding example is suspended with mechanical stirring in 670 cc. of water and 135 cc. of N-sulfuric acid. 67.5 g. of N-bromo succinimide are added thereto. The mixture is heated with stirring to 70° C. for two hours. After cooling to $+10°$ for one hour, the precipitated crystals are filtered with suction, washed with water, and dried. The resulting compound of Formula III is sufficiently pure for the next reaction step.

For purification the compound is recrystallyzed from a mixture of acetone and ether (1:2). It crystallizes in the form of colorless prisms which are insoluble in water, ether, aqueous alkalies, and aqueous acids, slightly soluble in chloroform and ethanol, and soluble in acetone. It has a melting point of 212° C. (with decomposition) and a rotatory power of $[\alpha]_D^{20} = -54° \pm 5°$ (concentration: 0.5% in ethanol).

*Analysis.*—$C_{12}H_{12}O_4NBr$; molecular weight=314.15. Calculated: 45.87% C; 3.85% H; 20.37% O; 4.46% N; 25.44% Br. Found: 46.0% C; 3.9% H; 20.1% O; 4.5% N; 24.9% Br.

The compound has not yet been described in the literature.

EXAMPLE 3

*Preparation of the levorotatory lactone of 6α-bromo-8β-hydroxy-2α-cyano-3β,5β-epoxy - 7 - oxo - 4aα,8aα-decahydronaphthalene - 1β - carboxylic acid (Formula IV)*

The total amount of the crude lactone compound of Formula III obtained according to Example 2 is suspended in 400 cc. of acetic acid. This amount corresponds to that obtained from 100 g. of the lactone of 2α - bromo-8β-hydroxy-3β,5β-epoxy - 1,2,3,4,4aα,5,8,8aα-octahydronaphthalene-1β-carboxylic acid of Formula I. 45 g. of chromic acid anhydride, 45 cc. of water, and sufficient pure acetic acid to make up the mixture to a volume of 380 cc. are added at once thereto. During the addition, the reaction mixture is cooled in an ice bath and stirred. After the temperature has been kept at about 25° C. for 10 minutes, it again decreases. The mixture is allowed to stand at 20° C. overnight. The separated crystals are filtered with suction, washed with water, and dried. 68 g. (59% calculated for charged starting material of Formula I) of the levorotatory lactone of 6α-bromo - 8β - hydroxy-2α-cyano-3β,5β-epoxy-7-oxo-4aα,8aα-decahydronaphthalene - 1β - carboxylic acid melting at 210° C. (with decomposition) are obtained. The crude compound can be used without further purification for the next reaction step.

On recrystallization from acetone, beige colored prisms (the coloration is caused by the presence of small amounts of the chromium salt of the corresponding carboxylic acid compound) are obtained which are insoluble in water, ethanol, benzene, ether, chloroform, slightly soluble in acetone, and soluble in dimethyl formamide. The compound melts at 210° C. (with decomposition) and has a rotatory power of $[\alpha]_D^{20} = -46° \pm 5°$ (concentration: 0.5% in dimethyl formamide).

*Analysis.*—$C_{12}H_{10}O_4NBr$; molecular weight=312.13. Calculated: 46.17% C; 3.23% H; 20.50% O; 4.49% N; 25.60% Br. Found: 46.2% C; 3.2% H; 20.5% O; 4.5% N; 25.3% Br.

The compound has not yet been described in the literature.

EXAMPLE 4

*Preparation of 3β-hydroxy-2α-cyano - 7 - oxo-1,2,3,4,4aα,7,8,8aα-octahydronaphthalene-1-carboxylic acid (Formula V)*

20 g. of the crude levorotatory lactone of 6α-bromo-8β - hydroxy-2α-cyano-3β,5β-epoxy-7-oxo-4aα,8aα - decahydronaphthalene-1β-carboxylic acid obtained according to the preceding example, are added to a mixture of 360 cc. of acetone, 40 cc. of acetic acid, and 40 g. of zinc powder within a period of 10 minutes while stirring and maintaining a temperature of 20° C. by cooling from the outside. After stirring for 20 minutes the temperature drops to 10° C. After the addition of a filter aid, the precipitated crystals are filtered with suction and washed with acetone. On evaporating the combined filtrate and wash liquids to dryness in a vacuum, the residue is dissolved in 30 cc. of water at 50° C. The solution is cooled to 20° C. The precipitated crystals are separated by filtration. Thereby 2 g. to 3 g. of an insoluble compound corresponding to 10% to 15% of the starting material, are obtained. The pH-value of the mother liquor is adjusted to a pH of 1.0 by the addition of sulfuric acid diluted with water in a proportion of 1:5 and saturated with sodium chloride. Thereby, 3β-hydroxy-2α-cyano-7-oxo-1,2,3,4,4aα,7,8,8aα-octahydronaphthalene-1β-carboxylic acid crystallizes. After cooling in an ice bath, the separated crystals are filtered with suction, washed with water, and dried at 80° C. The yield is 8.8 g. (58% of the theoretical amount). The crude compound melts at 252° C. It can be used without further purification for the next reaction step. On recrystallization from a mixture of acetone and ether, the compound forms colorless small pyramids which are insoluble in ether, benzene, chloroform, slightly soluble in ethanol, water, dilute acids, and soluble in acetone and dilute aqueous alkali hydroxide solution. It has a rotatory power of $[\alpha]_D^{20} = -125° \pm 5°$ (concentration: 0.5% in ethanol).

*Analysis.*—$C_{12}H_{13}O_4N$; molecular weight=235.23. Calculated: 61.27% C; 5.57% H; 27.21% O; 5.96% N. Found: 61.2% C; 5.8% H; 27.4% O; 5.9% N.

The compound has not yet been described in the literature.

EXAMPLE 5

*Preparation of the levorotatory methyl ester of 3β-acetoxy-2α-cyano - 7 - oxo-1,2,3,4,4aα,7,8,8aα-octahydronaphthalene-1β-carboxylic acid (Formula VIII)*

(a) Preparation of said compound by using the levorotatory methyl ester of 3β-hydroxy-2α-cyano-7-oxo-1,2,3,4,4aα,7,8,8aα,octahydronaphthalene - 1β - carboxylic acid (Formula VI) as intermediate.

A suspension of 27 g. of 3β-hydroxy-2α-cyano-7-oxo-1,2,3,4,4aα,7,8,8aα - octahydronaphthalene - 1β - carboxylic acid of Formula V obtained according to the preceding example in 27 cc. of methanol is cooled to 0° C. After the addition of a solution of diazomethane in methylene chloride, the mixture is allowed to stand for 5 minutes at 0° C. It is then evaporated to dryness in a vacuum. The resulting resinous compound can directly be used for the acetylation reaction described hereinbelow.

The pure compound of Formula VI is isolated by chromatographic absorption of its methylene chloride solution on neutral aluminum oxide. It is recrystallized from a mixture of acetone and ether. In its anhydrous state it crystallizes in the form of colorless prisms. In its hydrated state it contains 1 mol of water and crystallizes also in the form of colorless fine needles. It is insoluble in ether, very slightly soluble in water, and soluble in ethanol, acetone, benzene, and chloroform. The anhydrous compound melts at 172 °C. and has a rotatory power of $[\alpha]_D^{20} = -99° \pm 5°$ (concentration: 0.5% in ethanol).

*Analysis.*—$C_{13}H_{15}O_4N$; molecular weight=249.26. Calculated: 62.6% C; 6.07% H; 25.68% O; 5.62% N. Found: 62.5% C; 6.1% H; 25.8% O; 5.6% N.

The compound has not yet been described in the literature.

The resinous compound obtained on reaction with diazomethane is dissolved in 54 cc. of pyridine and 40 cc. of acetic acid anhydride. After standing at 20° C. overnight, 20 cc. of water are added and the mixture is allowed to stand for one hour. It is then poured on a mixture of ice and hydrochloric acid. The resulting mixture is extracted with methylene chloride. The extracts are washed with sodium bicarbonate solution, dried over magnesium sulfate, and subjected to chromatographic absorption on 500 g. of neutral aluminum oxide, wherefrom it is eluted with methylene chloride. On cooling, the compound crystallizes. It is recrystallized from moist ether. 25.7 g. (76% of the theoretical amount) of the methyl ester of 3β-acetoxy-2α-cyano-7-oxo-1,2,3,4, 4aα,-7,8,8aα-octahydronaphthalene-1β-carboxylic acid are obtained in the form of colorless prisms which are insoluble in ether, soluble in ethanol, acetone, benzene, and chloroform. The compound melts at 103° C. and has a rotatory power of $[\alpha]_D^{20} = -142° \pm 5°$ (concentration: 0.5% in ethanol).

Analysis. — $C_{15}H_{17}O_5N$; molecular weight=291.29. Calculated: 61.85% C; 5.88% H; 27.46% O; 4.81% N. Found: 61.9% C; 5.9% H; 27.6% O; 4.9% N.

The compound has not yet been described in the literature.

(b) Preparation of said compound by using 3β-acetoxy-2α-cyano-7-oxo-1,2,3,4,4aα,7,8,8aα-octahydronaphthalene-1β-carboxylic acid (Formula VII) as intermediate.

2 g. of the crude 3β-hydroxy-2α-cyano-7-oxo-1,2,3,4-4aα,7,8,8aα-octahydronaphthalene-1β-carboxylic acid obtained according to Example 4 are dissolved in 4 cc. of pyridine and 3 cc. of acetic acid anhydride. The reaction mixture is allowed to stand for 1 hour at 20° C. After the addition of water, the pH-value of the reaction mixture is adjusted to a pH of 1.0 by the addition of concentrated hydrochloric acid. The reaction mixture is saturated with sodium chloride and extracted with methylene chloride. The extracts are dried and evaporated to dryness in a vacuum. The residue is dissolved in a mixture of ethyl acetate and ether (1:1). The crystals are filtered with suction and dried. After recrystallization from a mixture of ethyl acetate and ether, 1.65 g. (70% of the theoretical amount of 3β-acetoxy-2α-cyano-7-oxo-1,2,3,4,4aα,7,8,8aα - octahydronaphthalene - 1β - carboxylic acid melting at 200° C. and having a rotatory power of $[\alpha]_D^{20} = -160° \pm 5°$ (concentration: 0.5% in ethanol) are obtained. The compound crystallizes in the form of colorless leaflets which are insoluble in ether, slightly soluble in water, benzene, and chloroform, and soluble in ethanol, acetone, and dilute aqueous alkali metal hydroxide solution.

Analysis. — $C_{14}H_{15}O_5N$; molecular weight=277.27. Calculated: 6.64% C; 5.45% H; 28.85% O; 5.05% N. Found: 60.7% C; 5.3% H; 28.7% O; 5.0% N.

The carboxylic acid compound of Formula VII obtained as described hereinabove is esterified by means of diazomethane as described in Example 5a, whereby the methyl ester compound of Formula VIII is obtained which is identical with the compound described in Example 5a.

EXAMPLE 6

Prepartion of 1β-carboxy methyl-2β-methoxy carbonyl-3-cyano-4β-acetoxy-6β-formyl cyclohexane (Formula IX).

7 g. of the methyl ester of 3β-acetoxy-2α-cyano-7-oxo-1,2,3,4,4aα,7,8,8aα - octahydronaphthalene - 1β - carboxylic acid obtained according to Example 5 are dissolved in 170 cc. of ethyl acetate. 30 cc. of the solvent are distilled off in order to remove traces of water. After cooling to −30° C., a current of oxygen containing 1–2% of ozone is passed through the solution at a speed of 0.4 l. per minute for 2 hours. Excess ozone is removed by passing nitrogen through the reaction solution and, thereafter, subjecting the solution to a vacuum with stirring. 3.5 g. of potassium iodate, 3.5 cc. of sulfuric acid diluted with water in a proportion of 1:5, and 70 cc. of water are added while stirring and maintaining the temperature at −30° C. The mixture is heated to 35° C. for one hour while stirring, cooled, saturated with sodium chloride, and extracted by means of ethyl acetate. The acid fraction is separated from the ethyl acetate solution by means of sodium bicarbonate solution. The resulting sodium bicarbonate solution is acidified to a pH of 1.0 by the addition of concentrated hydrochloric acid and is then extracted with methylene chloride. These last operations must be carried out at low temperature and very quickly. The methylene chloride extracts are dried and evaporated to dryness in a vacuum. The residue amounts to about 8 g. It represents the desired compound of Formula IX and is used without further purification for the next reaction step. Decomposition of the ozonide compound can also be carried out by means of water without potassium iodate and sulfuric acid. However, the yields obtained when following this method are lower.

EXAMPLE 7

Preparation of the methyl ester of 1β-carboxy methyl-2β-methoxy- carbonyl-3α-cyano-4β-acetoxy-6β-formyl cyclohexane (Formula X)

8 g. of the resinous compound obtained according to the preceding example are dissolved in 14 cc. of methylene chloride. A diazomethane solution in methylene chloride containing 1% thereof is added slowly at 0° C. until the color of the reaction mixture remains yellow, thus showing an excess of diazomethane. After allowing the solution to stand for 5 minutes, it is evaporated to dryness in a vacuum. The residue which represents the desired compound of Formula X is used without further purification for the next reaction step.

EXAMPLE 8

Preparation of the methyl ester of 18β-acetoxy-11-methoxy-17α-cyano-16β-methoxy carbonyl - 2,3,3,4 - diseco-$\Delta^{4(21)}$,20α-yohimbene-3-carboxylic acid (Formula XI)

A moderately warm solution of 4.9 g. of 6-methoxytryptamine in 245 cc. of anhydrous tetrahydrofuran is added to the total amount of the residue resulting from the last mentioned reaction step of Example 7. After standing at 30° C. for 20 minutes, the reaction mixture is evaporated to dryness in a vacuum. The resinous brown compound which represents the desired methyl ester compound of Formula XI, is used without further purification for the next reaction step.

EXAMPLE 9

Preparation of dextrorotatory 11 - methoxy - 17α - cyano-18β-hydroxy-3-oxo - 16β - methoxy carbonyl 2,3 - seco-20α-yohimbane (Formula XII)

The brown gum-like compound obtained according to Examples 6, 7, and 8 by starting from 7 g. of the methyl ester of 3β-acetoxy - 2α - cyano-7-oxo-1,2,3,4,4aα,7,8,8aα-octahydronaphthalene-1β-carboxylic acid is dissolved in 140 cc. of anhydrous methanol. 4.2 g. of potassium boronhydride are added. After allowing the mixture to stand for 10 minutes at 10° C., it is refluxed for about 15 minutes and concentrated in a vacuum to a volume of 30 cc. Excess boronhydride is destroyed by the addition of a few drops of acetic acid. The pH-value of the mixture is adjusted to a pH of 1.0 by the addition of hydrochloric acid. The solution is extracted by means of chloroform containing 30% of ethanol. The extracts are dried and evaporated to dryness. The residue is triturated with methanol, filtered with suction, washed, and dried at 80° C. 3.45 g. (34% of the theoretical amount) of 11-methoxy-17α-cyano-18β-hydroxy-3-oxo-16β - methoxy carbonyl-2,3-seco-20α-yohimbane are obtained which are used without further purification for the next reaction step. By recrystallization from methanol, the compound is obtained in a pure state. It has a melting point at 233° C. and a rotatory power of $[\alpha]_D^{20} = +32° \pm 5°$ (concentration: 0.5% in ethanol). The compound, which has not yet been described, crystallizes in the form of prisms which are insoluble in ether, water, dilute aqueous acids, and dilute alkali metal hydroxide solutions, slightly soluble in ethanol, and soluble in acetone, benzene, and chloroform.

Analysis.—$C_{23}H_{27}O_5N_3$; molecular weight=425.47. Calculated: 64.92% C; 6.40% H; 18.80% O; 9.88% N. Found: 64.9% C; 6.4% H; 18.8% O; 9.6% N.

EXAMPLE 10

Preparation of 11-methoxy-17α-cyano-18β-acetoxy-3-oxo-16β-methoxy carbonyl-2,3-seco-20α-yohimbane (Formula XIII)

A solution of 10.4 g. of 11-methoxy-17α-cyano-18β- hydroxy-3-oxo-16β-methoxy carbonyl-2,3 - seco - 20α - yohimbane obtained according to Example 9, in 40 cc. of pyridine and 24 cc. of acetic acid anhydride is heated at 60° C. for 20 minutes. The solution is evaporated to dryness in a vacuum and the residue is taken up with 20 cc. of ethyl acetate. After the addition of 30 cc. of ether, the solution is cooled in an ice bath, the precipitated crystals are filtered with suction, washed with ether, and dried at 90° C. 10.5 g. (92% of the theoretical amount) of the desired product in the crude state are obtained, which is used without further purification for the next reaction step.

The pure compound is obtained by recrystallization from a mixture of acetone and ether. It has a melting point of 200° C. and a rotatory power of $[\alpha]_D^{20} = +48° \pm 5°$ (concentration: 0.5% in ethanol). The compound crystallizes in the form of colorless prisms which are insoluble in water, ether, aqueous acids, and alkali metal hydroxide solution and soluble in ethanol, acetone, benzene, and chloroform.

*Analysis.*—$C_{25}H_{29}O_6N_3$; molecular weight=467.51. Calculated: 64.22% C; 6.25% H; 20.53% O; 8.99% N. Found: 64.3% C; 6.4% H; 20.5% O; 9.0% N.

The compound has not yet been described in the literature.

EXAMPLE 11

*Preparation of levorotatory 11-methoxy-17α-cyano-18β-acetoxy-16β-methoxy carbonyl-$\Delta^{3(14)}$, 20α-yohimbene (Formula XIV)*

6 g. of crude 11-methoxy-17α-cyano-18β-acetoxy-3-oxo-16β-methoxy carbonyl-2,3-seco-20α-yohimbane obtained according to Example 10 are refluxed for one hour and a half in 60 cc. of phosphorus oxychloride. Excess phosphorus oxychloride is removed by distillation in a vacuum. After evaporation to dryness, the residue is taken up with 60 cc. of acetone, the solution is cooled to 0° C., ammonia and then 90 cc. of water are added, whereon the desired compound crystallizes. The reaction mixture is cooled in an ice bath and the precipitated compound is filtered with suction, washed with water, and then with methanol, and dried at 80° C. 5.46 g. (95% of the theoretical amount) of crude 11-methoxy-17α-cyano-18β-acetoxy-16β-methoxy carbonyl-$\Delta^{3(14)}$,20α-yohimbene are obtained which are used without further purification for the next reaction step.

The compound may be purified by recrystallization from a mixture of acetone and water. It has a melting point of 280–285° C. and a rotatory power of $[\alpha]_D^{20} = -13° \pm 10°$ (concentration: 0.5% in chloroform). The compound crystallizes in the form of slightly yellow prisms which are soluble in ether, water, dilute alkali hydroxide solutions, slightly soluble in ethanol, and soluble in acetone, benzene, chloroform, and dilute aqueous acids.

*Analysis.*—$C_{25}H_{27}O_5N_3$; molecular weight=449.49. Calculated: 66.80% C; 6.05% H; 9.35% N. Found: 66.7% C; 6.1% H; 9.3% N.

The compound has not yet been described in the literature.

EXAMPLE 12

*Reduction of the double bond in 3,14-position of 11-methoxy-17α-cyano-18β-acetoxy-16β-methoxy carbonyl-$\Delta^{3(14)}$,20α-yohimbene*

(a) Preparation of 11-methoxy-17α-cyano-18β-acetoxy-16β-methoxy carbonyl-3α,20α-yohimbane (Formula XV).

A solution of 200 mg. of 11-methoxy-17α-cyano-18β-acetoxy-16β-methoxy carbonyl-$\Delta^{3(14)}$,20α-yohimbene obtained according to Example 11, in 6 cc. of methanol and 0.1 cc. of concentrated hydrochloric acid is treated with 100 mg. of sodium boronhydride at +0° C. After the addition of 6 cc. of water, the precipitated compound is filtered with suction, washed with water and then with methanol, and dried at 90° C. 166 mg. (82% of the theoretical amount) of the 3α-isomer are obtained which is recrystallized from aqueous acetone. The compound melts at 290° C. and has a rotatory power of $[\alpha]_D^{20} = -96° \pm 5°$ (concentration: 0.5% in dimethyl formamide). It has not yet been described in the literature. It crystallizes in the form of slightly yellow prisms which are insoluble in water, ether, dilute aqueous alkali metal hydroxide solutions, slightly soluble in ethanol and acetone, and soluble in chloroform and dilute aqueous acids.

(b) Preparation of 11-methoxy - 17α - cyano-18β-acetoxy-16β-methoxy carbonyl-3β,20α-yohimbane (Formula XVI).

A mixture of 1 g. of 11-methoxy-17α-cyano-18β-acetoxy-16β-methoxy carbonyl-$\Delta^{3(14)}$,20α-yohimbene of Formula XIV prepared according to Example 11, 40 cc. of acetic acid and 5 g. of zinc powder are refluxed for 10 minutes. The reaction mixture is filtered with suction after the addition of a filter aid. The filter residue is washed with water. After cooling in an ice bath, excess ammonia is added to the filtrate. The solution is extracted with methylene chloride. The extracts are dried over magnesium sulfate and evaporated to dryness. The residue is dissolved in acetone and dilute nitric acid is added. The nitrate of the 3α-isomer precipitates and is filtered off. On adding ammonia to the filtrate, the 3β-isomer is precipitated. It is filtered with suction and washed with methanol. The compound is purified by recrystallization from acetone. It crystallizes in the form of slightly yellow needles which melt at 305° C. and have a rotatory power of $[\alpha]_D^{20} = -120° \pm 20°$ (concentration: 0.2% in dimethyl formamide). The compound is insoluble in ether, water, aqueous alkali metal hydroxide solutions, slightly soluble in ethanol, acetone, benzene, chloroform, and soluble in dilute aqueous acids.

*Analysis.*—$C_{25}H_{29}O_5N_3$; molecular weight: 451.51. Calculated: 66.5% C; 6.47% H; 17.72% O; 9.31% N. Found: 66.4% C; 6.5% H; 17.7% O; 9.2% N.

The compound has not yet been described in the literature.

EXAMPLE 13

*Preparation of levorotatory 11-methoxy-17α-cyano-18β-hydroxy - 16β - methoxy carbonyl-3β,20α-yohimbane (Formula XVII)*

1.65 g. of the 3β-isomer obtained according to Example 12b, 66 cc. of anhydrous methanol and 660 mg. of potassium boronhydride are refluxed for one hour. The reaction mixture is cooled in an ice bath and the precipitated crystals are filtered with suction, washed with water and methanol and dried at 90° C. The crude 11-methoxy-17α-cyano-18β-hydroxy - 16β - methoxy carbonyl-3β, 20α-yohimbane weighing 1.175 g. (80% of the theoretical amount) is used without further purification for the next reaction step. On recrystallization from a mixture of methylene chloride and methanol, it crystallizes in the form of slightly yellow crystals which melt at 295° C. The compound has a rotatory power of $[\alpha]_D^{20} = -155° \pm 5°$ (concentration: 0.5% in dimethyl formamide) and is insoluble in water, ether, chloroform, and dilute aqueous alkali metal hydroxide solutions, slightly soluble in ethanol and acetone, and soluble in dilute aqueous acids.

*Analysis.*—$C_{23}H_{27}O_4N_3$; molecular weight=409.47. Calculated: 67.46% C; 6.65% H; 15.6% O; 10.26% N. Found: 67.2% C; 6.5% H; 15.8% O; 10.1% N.

The compound has not yet been described in the literature.

EXAMPLE 14

*Preparation of 11-methoxy-17α-cyano-16β-methoxy carbonyl-18β-(3',4',5'-trimethoxy benzoyloxy-3β-20α-yohimbane (Formula XVIII)*

1.05 g. of 11-methoxy-17α-cyano-18β-hydroxy-16β- methoxy carbonyl-3β,20α-yohimbane obtained according to Example 13, 2.4 g. of 3,4,5-trimethoxy benzoylchloride, and 20 cc. of pyridine are mixed. The reaction vessel is stoppered and heated in an oven at 75° C. for 17 hours. After cooling, 5 cc. of water are added and the mixture is allowed to stand at 40° C. for half an hour. It is then acidified by the addition of a mixture of ice and hydrochloric acid and extracted by means of methylene chloride. The extracts are washed successively with water and ammonia, dried over magnesium sulfate, and evaporated to dryness in a vacuum. The residue is taken up with methanol. After cooling in an ice bath, the precipitated crystals are filtered with suction, washed with cold methanol, and dried. 0.95 g. (65% of the theoretical amount) of 11-methoxy-17α-cyano-16β-methoxy carbonyl-18β-(3′,4′,5′-trimethoxy benzoyloxy)-3β,20α-yohimbane which is recrystallized from aqueous acetone, are obtained. The compound has a melting point at 298° C. and a rotatory power of $[\alpha]_D^{20} = -107° \pm 5°$. (Concentration: 0.5% in chloroform). It forms slightly yellow crystals which are insoluble in water, ether, dilute aqueous acids, and alkali metal hydroxide solutions, slightly soluble in ethanol, and soluble in choroform and acetone.

*Analysis.*—$C_{33}H_{37}O_8N_3$; molecular weight=603.65. Calculated: 65.66% C; 6.18% H; 21.20% O; 6.96% N. Found: 65.6% C; 6.2% H; 21.2% O; 7.1% N.

The compound has not yet been described in the literature.

The present invention is not limited to the use of the described optically active forms of the yohimbane compounds. The enantiomorphous compounds or racemates of the same may also be used in the process according to the present invention.

We claim:
1. The 11-methoxy-17α-cyano-16β-methoxy carbonyl-20α-yohimbane compound of the formula

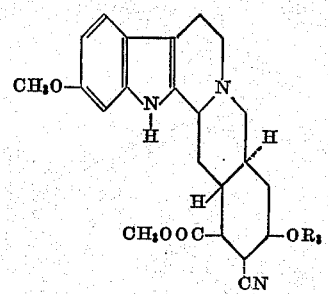

wherein $R_3$ is a member selected from the group consisting of hydrogen, a lower alkanoyl group, and the 3,4,5-trimethoxy benzoyl group.

2. 11-methoxy-17α-cyano-18β-acetoxy - 16β - methoxy carbonyl-3α,20α-yohimbane.

3. 11-methoxy-17α-cyano-18β-acetoxy - 16β - methoxy carbonyl-3β,20α-yohimbane.

4. 11-methoxy-17α-cyano-18β-hydroxy - 16β - methoxy carbonyl-3β,20α-yohimbane.

5. 11-methoxy-17α-cyano-18β-(3′,4′,5′-trimethoxy benzoyloxy)-16β-methoxy carbonyl-3β,20α-yohimbane.

References Cited in the file of this patent

Woodward et al.: Jour. Am. Chem. Soc., vol. 78, pp. 2023–2025, May 5, 1956.

Degering: An Outline of Organic Nitrogen Compounds, Univ. Litho. Mich., 1945, page 535, paragraph 1702.

UNITED STATES PATENT OFFICE
Certificate of Correction

Patent No. 2,907,769                                                    October 6, 1959

Georges Muller et al.

It is hereby certified that error appears in the printed specification of the above numbered patent requiring correction and that the said Letters Patent should read as corrected below.

Column 1, line 26, for "transquilizers" read —tranquilizers—; lines 63 to 71, inclusive, the formulas should read as shown below instead of as in the patent:

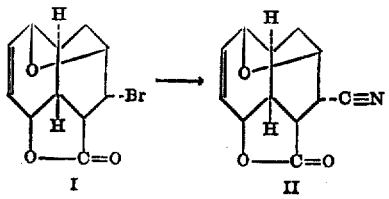

column 2, lines 1 to 10, inclusive, the formulas should read as shown below instead of as in the patent:

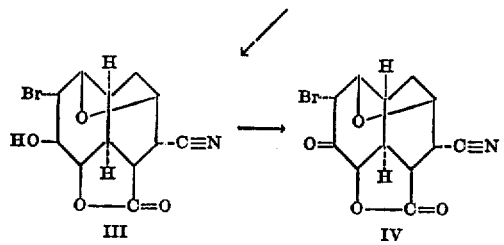

column 5, line 70, for "11-methovy-" read —11-methoxy-—; column 10, line 8, strike out the hyphen after "methoxy"; column 11, line 74, for "+0° C." read — +10° C. —; column 14, lines 5 to 15, inclusive, the formula should read as shown below instead of as in the patent:

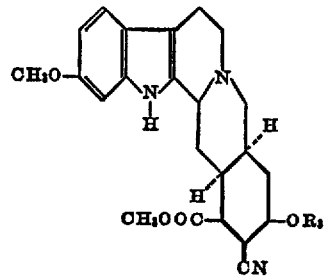

Signed and sealed this 17th day of May 1960.

[SEAL]

Attest:
KARL H. AXLINE,
Attesting Officer.

ROBERT C. WATSON,
Commissioner of Patents.